Figure 4:
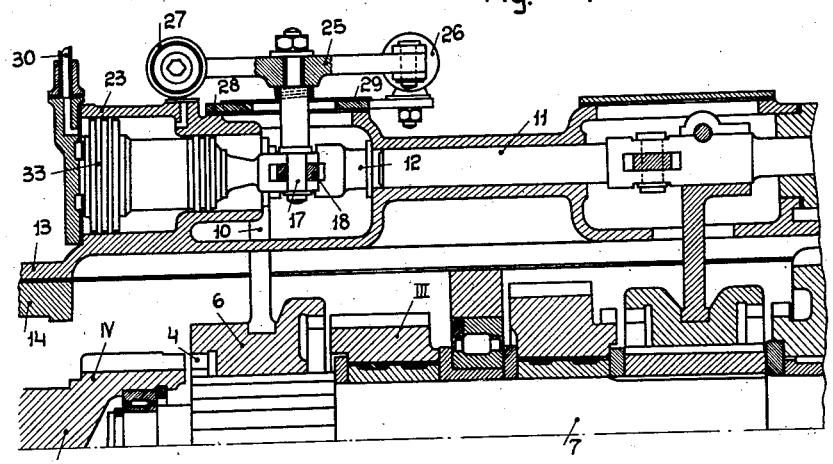

March 5, 1935.  C. PENATI  1,993,247
FLUID PRESSURE CHANGE SPEED GEAR CONTROL DEVICE FOR
MOTOR VEHICLES, ESPECIALLY MOTOR-RAIL-CARS
Filed July 20, 1933  2 Sheets-Sheet 1
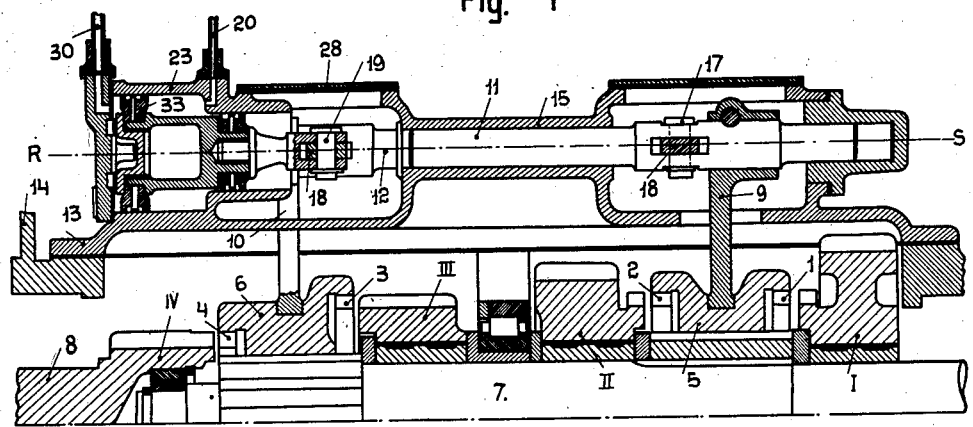
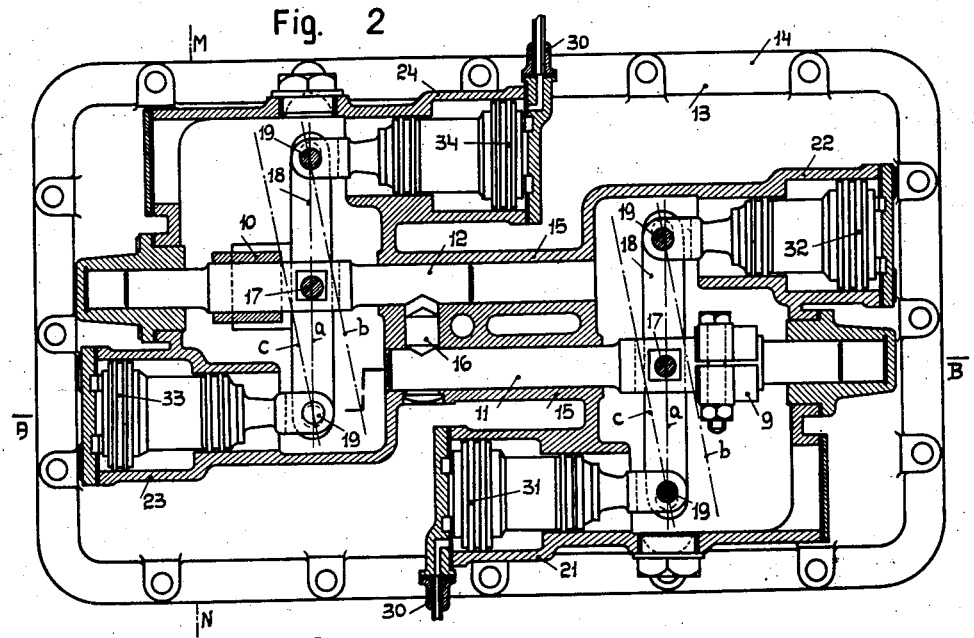
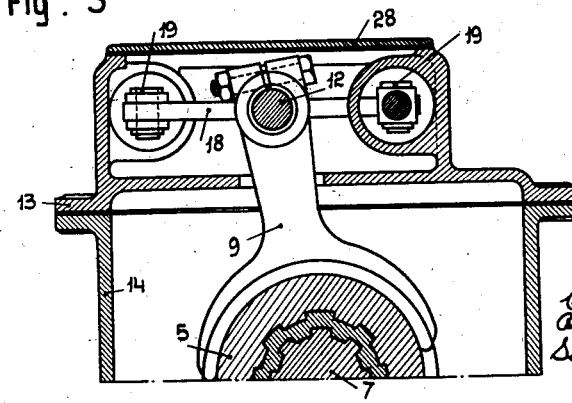
Inventor
Carlo Penati
by
Summers & Young
Attys.

Patented Mar. 5, 1935

1,993,247

UNITED STATES PATENT OFFICE 1,993,247

FLUID PRESSURE CHANGE-SPEED GEAR CONTROL DEVICE FOR MOTOR VEHICLES, ESPECIALLY MOTOR-RAIL-CARS

Carlo Penati, Turin, Italy, assignor to Fiat Società Anonima, Turin, Italy

Application July 20, 1933, Serial No. 681,363
In Italy October 15, 1932

2 Claims. (Cl. 74—364)

The operation of a change in speed in a change-speed gear for large motor-rail vehicles, especially railway and tramway motor cars requires not a little effort, owing to the inertia of the sliding members (sleeves or toothed wheels) and the width of the movement required.

The present invention has for its object a fluid-pressure control device for change speed gears. The fluid employed will preferably be compressed air when the vehicle is provided with a device for setting up compressed air for working the brakes. The control device according to this invention dispenses with complicated mechanical devices for controlling the change from a distance.

The operation on the part of the driver will be reduced to that of working a multi-way cock.

According to the present invention for the operation of the sliding members levers are used which couple the controls of the sliding members by pairs, in such manner that it is impossible for two members of the same pair to be clutched in simultaneously. The operating rod for a pair of controls is coupled with the operating rod for the other pair by a lock member which, when one pair is in operative position, locks the other pair. The accidental throwing in of two gears is thus avoided. Each rod which, according to a well-known construction controls a sliding member, in one direction for one speed and in the opposite direction for another, carries a rocking lever, the ends of which are articulated by an oval eye to the rods of two compressed air cylinder pistons, acting in opposite directions. The pin of one rod acts as a fulcrum of a lever of the second kind, when one of the pistons is acted upon by the compressed air: The lever oscillates on said fulcrum carrying along the rod in one direction for throwing in one speed and in the opposite direction for another speed.

The cylinder which has performed the change of speed remains under pressure and maintains the sliding member in the clutched in position. If the pressure is relieved (by operating the above mentioned cock) the neutral position is resumed under the action of springs which had been compressed or stretched in the speed changing operation, or of compressed air. In the latter case, according to the invention, the control pistons are of the differential type; on the side of their smaller face they are in constant communication with the compressed air tank and on the side of their larger face they are brought into communication one at a time with the tank by means of the above mentioned cock.

The object of the invention will be described in detail with reference to the constructions shown by way of example on the annexed drawings.

Figure 5:
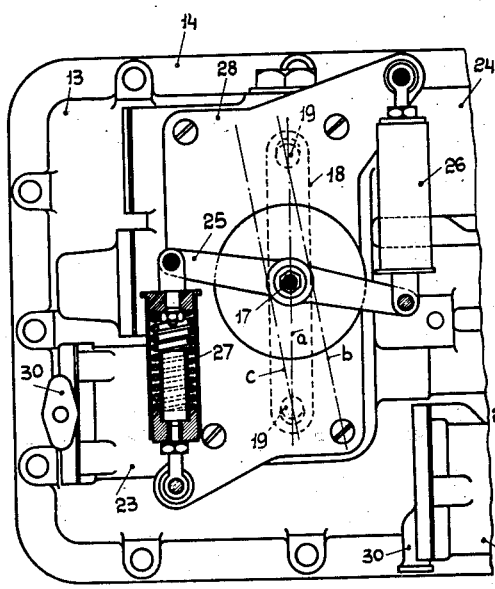
Figure 6:
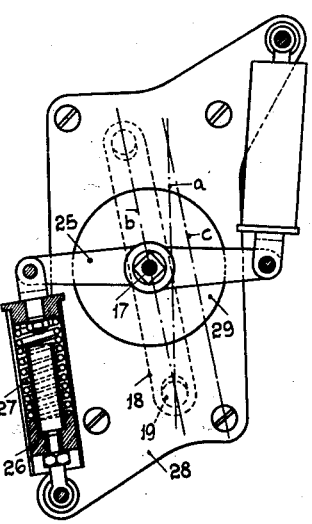

Figures 1 to 3 inclusive refer to the first form of construction in which the return of the sliding members of the clutch to their neutral position is controlled by means of compressed air, and Figures 4 to 6 inclusive refer to a modified form in which the return is effected by springs.

Figure 1 is a section on the line A—B of Figure 2 showing the first construction; Figure 2 is a section on the line R—S of Figure 1; and Figure 3 is a section on the line M—N of Figure 2. Figure 4 shows the device in which the sliding clutch members are returned to their neutral position under the action of a spring in a sectional view similar to that of Figure 1; Figure 5 is a plan in the neutral position while Figure 6 is a plan in the clutched in position.

The change of speed taken for example is of the well known type with four speeds, of which the top speed is directly coupled and has its toothed gears constantly in mesh. I, II, III indicate the three gearings of the driven shaft 7 which receives rotation from the secondary shaft, and IV indicates the gearing of the engine shaft 8 which transmits continuously the rotation to the secondary shaft. The movement of the clutch sleeves 5 and 6 causes in a well known manner their teeth 1, 2, 3 and 4 to mesh with those of the wheels I, II, III and IV, respectively, by means of forks 9 and 10 carried by means of keys by the speed control rods 11 and 12.

The rods 11 and 12 guided in parallel guides 15 from which they project one at one end and one at the other end, have a notch in which the conical ended cross stop pin 16 may be engaged, locking one of the rods in the neutral position, while the other is in the geared in position. Since one sleeve can obviously only engage with one clutch, there is no possibility of more than one clutch being coupled at a time.

This invention relates more particularly to the mechanism operating the rods, which is located, together with the rods on the cover 13 of the change-speed box 14.

Each rod carries at its end projecting from the guide 15 by means of a pin 17 a swing lever 18 with elongated holes at its ends. In these holes are engaged the pins 19 of the rods of the differential pistons 31, 32, 33, 34 of the cylinders 21, 22, 23, 24 for throwing in the speeds I, II, III and IV, respectively. The part of each cylinder disposed between the smaller and the larger piston face is in constant communication in the construction shown in Figures 1, 2 and 3 with the compressed air tank through pipes. Of these pipes only the pipe 20 of the cylinder 23 is shown on Fig. 1. A pipe 30 seen for cylinders 21 and 24 in Figure 3 sets into communication the cylinder bottom of larger area with the atmosphere or with the pressure air tank under the action of a suitable control. The operation described above is obtained by the manipulation of a single four-way cock, not shown. In the neutral position, or uncoupled position, the four pipes 30 communicate with the atmosphere, the pistons are all subject to the pressure of the compressed air in the pipes 20 acting on the piston of smaller diameter and the swing levers 18 are in a balanced position. If, by means of the above mentioned cock, compressed air is led into one of the pipes 30, the respective piston will be under the action of compressed air on both its faces; however as this is a differential piston, the surfaces subjected to pressure are considerably different and the piston moves pushing outwardly the corresponding pin 19 and causing the swing lever 18 to oscillate, in the manner of a lever of the second kind on the other pin 19. Each of the swing levers 18 can thus take up three positions, shown in the drawings by the axes $a$, $b$ and $c$ respectively which correspond to three positions of the pin 17, i. e. of each rod, namely for the rod 11 shows the unclutched, first speed and second speed positions, and for the rod 12 the unclutched, third speed, fourth speed positions.

Should a piston be accidentally held in its clutched in position, the opposite piston suitably operated can return the sleeve to its uncoupled position. According to the modification shown in Figures 4, 5 and 6 the sliding members of the change gear are returned to their neutral position by springs. The pin 17 rotates with the swing lever 18 and with a second swing lever 25 which thus oscillates with the former. At the ends of the swing lever 25 is fixed one of the members of the telescopic box 26 containing the compression springs 27, the other member of which is fixed to extensions of the plate 28 rigidly secured to the cover 13 and forming together with the movable discs 29 a cover for the articulated system.

In their neutral position the axes of the springs 27 are parallel; when removed from this position in one direction or the other they will be compressed (Figure 6). This occurs at every oscillation of the swing levers 18 and 25: As soon as the pressure on the piston, which has caused the oscillation, ceases, the springs return the swing levers to their neutral position, performing the same operation fulfilled in the construction according to Figures 1 to 3 by the compressed air in the tubings 20. In comparison with the latter construction, in the embodiment according to Figures 4 to 6, it is not necessary to maintain or put under pressure the space in the cylinders between the larger and the smaller piston surface. Therefore, there is in each case only one conduit instead of five and only one cylinder instead of four under pressure and only one piston packing instead of seven at work. The connections 20 shown in Fig. 1 are omitted in the construction according to Figures 4 to 6, thereby substantially reducing the risk of air leakage as well as the pressure air consumption.

The arrangement of the two springs relieves the pivot 17 from any flexure stress. Breakage of a spring does not interfere with the working of the device, the two springs being connected in parallel.

The drawings show some constructional details for facilitating the mounting of the various members, which are self-explanatory. The construction of these details and in general of the change speed control device may be varied between wide limits, according to the circumstances (type of change speed gear, power to be transmitted, available space, etc.) without departing from the scope of the invention.

I claim:—

1. In a change-speed gear having sliding members and control rods for operating said sliding members, means for shifting said rods comprising two cylinders placed on both sides of every control rod, pistons moving in said cylinders, swing levers pivoted centrally to said control rods and connected at their ends, by pins and holes, to said pistons, other swing levers rotating solidly with the swing levers previously referred to, spring members connected to the ends of said other swing levers and to fixed points in the change-speed gear and means for supplying, at will, fluid under pressure to one of said cylinders for producing a change of speed and for loading the corresponding spring members in such manner that when the pressure in said cylinder is relieved, said spring members bring the operated control rod into its inoperative position.

2. In a change-speed gear having sliding members and control rods for operating said sliding members, means for shifting said rods comprising two cylinders placed on both sides of every control rod, differential pistons moving in said cylinders, swing levers pivoted centrally to said control rod and connected at their ends by pins and holes, to said differential pistons, conduits for constantly supplying fluid under pressure to the ends of said cylinders facing the face of smaller area of the piston and conduits for setting, at will, the opposite end of the cylinder into communication with the fluid under pressure and with the atmosphere.

CARLO PENATI.